United States Patent Office 3,015,137
Patented Jan. 2, 1962

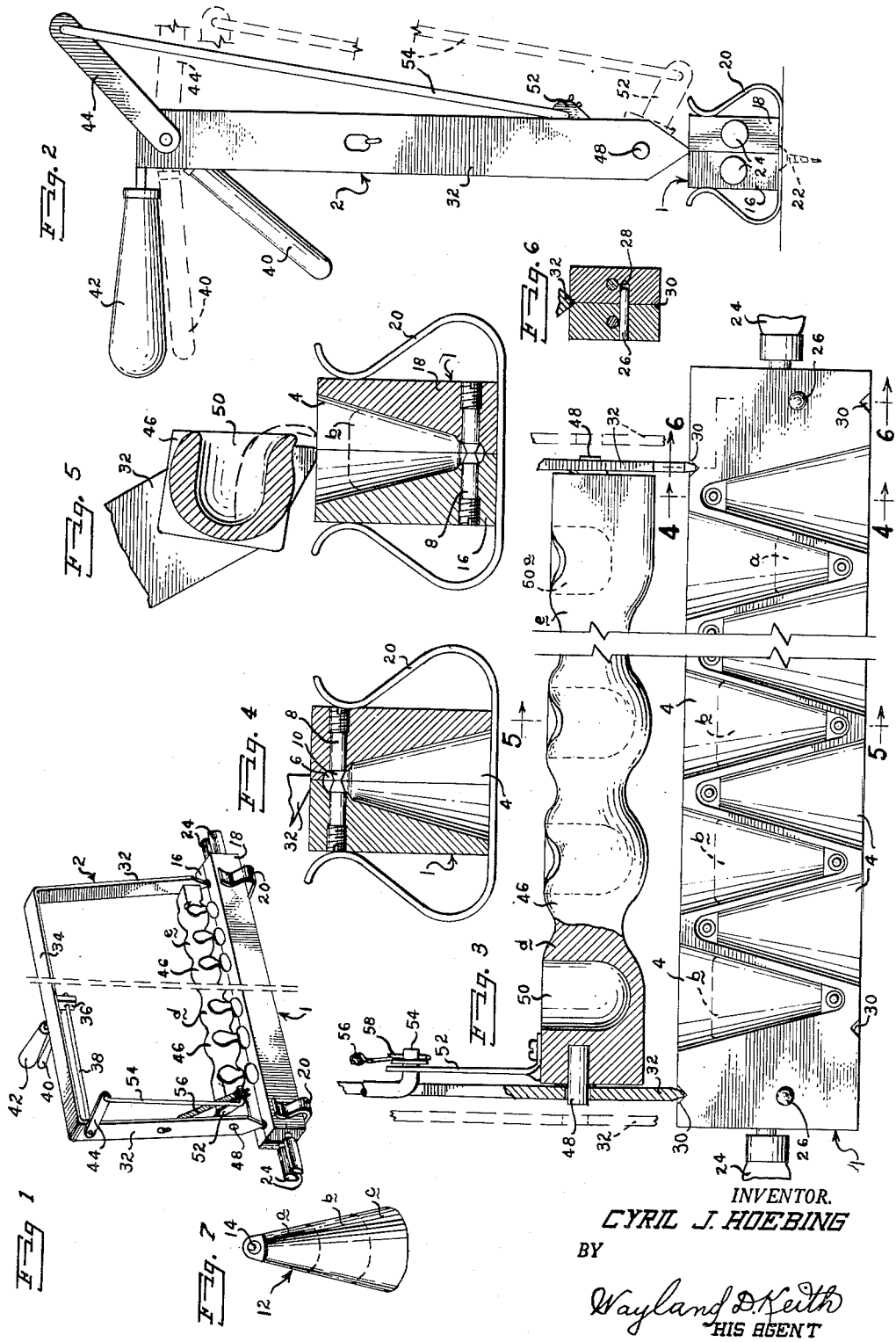

3,015,137
FISHING SINKER MOLDING APPARATUS
Cyril J. Hoebing, 1619 S. 8th St., Chickasha, Okla.
Filed Sept. 3, 1957, Ser. No. 681,789
5 Claims. (Cl. 22—57)

This invention relates to improvements in molds and more particularly to molds for molding fishing sinkers or other small articles, such as weights or the like.

Various molds for fishing sinkers, weights, and the like have been proposed heretofore, but these for the most part, would mold a fishing sinker or weight of a given size, and to vary from this particular size, a complete new mold had to be made. Since the making of molds is a very tedious job which requires great accuracy, to make molds for a variety of sizes of sinkers or weights, would mean a considerable investment.

In the present instance, a single, multi-cavity mold is provided, preferably with cavities on two sides thereof, as illustrated, and a multi-cavity pouring ladle, for filling the cavities of the mold, is provided.

The multi-cavity mold, and the multi-cavity pouring ladle, which is designed to complement the mold, is so constructed that sinkers or weights may be produced on a large scale, accurately and rapidly to a given size.

An object of this invention is to provide a multi-cavity mold and a complementary, multi-cavity pouring ladle, which are so constructed as to selectively pour a complete fishing sinker or weight without utilizing wire inserts or the like.

Another object of this invention is to provide a multi-cavity pouring ladle wherein the ladle element having the cavities therein, is so constructed that the ladle element may be quickly changed for pouring sinkers or weights of a different size.

Still another object of the invention is to provide a multi-cavity mold for molding fishing sinkers, weights and the like, which has a series of cavities formed therein on opposite sides of the mold, which cavities are spaced apart symmetrically with respect to a given point, so a pouring ladle with complementarily spaced cavities therein will register with the cavities of the respective sides of the mold.

A yet further object of the invention is to provide a multi-cavity mold wherein removable elements are provided for forming eyes within the fishing sinkers or weights.

A still further object of the invention is to provide a multi-cavity pouring ladle which is remotely actuated to pour a multiplicity of sinkers or weights simultaneously.

With these objects in mind and others which will become apparent as the description proceeds, reference is to be had to the accompanying drawings, in which like reference characters designate like parts in the several views thereof, in which:

FIG. 1 is a perspective view of a multi-cavity mold for molding fishing sinkers or weights and a multi-cavity pouring ladle for simultaneously pouring said sinkers or weights, which mold and which ladle have parts broken away; and showing a portion of a pouring ladle with cavities of a different size substituted therefor;

FIG. 2 is an end elevational view of the pouring ladle, which ladle is positioned on the multi-cavity mold, and showing the ladle actuating mechanism, in full outline, for dipping into the metal, with the ladle in position for pouring the metal therefrom being shown in dashed outline, with parts being broken away and shortened to bring out the details of construction;

FIG. 3 is a longitudinal view through the multi-cavity mold, and showing the multi-cavity ladle superposed thereabove, and with parts broken away and shown in section, and with other parts moved outward to show relative movement of the ladle frame with respect to the multi-cavity ladle, and showing parts broken away and shortened, and showing a portion of a ladle having smaller cavities therein for pouring sinkers or weights of a smaller size;

FIG. 4 is a sectional view taken substantially on the line 4—4 of FIG. 3, looking in the direction indicated by the arrows;

FIG. 5 is a sectional view taken substantially on the line 5—5 of FIG. 4, looking in the direction indicated by the arrows, but showing the ladle in pouring position;

FIG. 6 is a sectional view taken on the line 6—6 of FIG. 3, looking in the direction indicated by the arrows, but on a reduced scale; and FIG. 7 is a perspective view of a sinker or weight, as molded in the multi-cavity mold with marks thereon indicating how weights of various size, which are molded in the same mold, would appear.

With more specific reference to the drawing, the numeral 1 designates generally a multi-cavity mold and the numeral 2 designates generally a pouring ladle, having a multiplicity of ladle cavities or recesses, which pouring ladle is a cooperative element for the molding of a multiplicity of fishing sinkers or weights by simultaneous action.

The multi-cavity mold body 1 has a plurality of substantially identical cavities 4 along the length thereof, one-half of each cavity being formed in complementary mold members, on each side thereof, as will best be seen in FIGS. 3, 4, and 5. It is preferable to have the mold cavities conical in shape, with the respective apex portions thereof reduced and flattened, as indicated at 6. A pair of core pins 8 are positioned, one in each half cavity, to meet centrally of the reduced end portion 6 and are tapered, as indicated at 10, so when the pins abut they will mold a sinker or weight, indicated generally at 12 in FIG. 7, the eye of which will be chamfered from each side. The weight or sinker may be made of any length, as indicated at a, b, or c, in accordance with the particular pouring ladle used.

The complementary mold members 16 and 18 preferably are are held together by spring clips 20, which are of conventional design, which spring clips may be secured to a plane surface by means of screws 22. Each of the complementary mold members 16 and 18 has a handle on each end, which handles are preferably heat insulated to enable the lifting of the mold from the clips 20, and to enable turning the mold over so as to fill the mold cavities on the opposite side thereof, or, after the mold has been lifted from the clips 20, it may be opened by use of the handles, and the weights or sinkers removed therefrom.

A dowel pin 26, as is best seen in FIGS. 3 and 6, is provided at each end of one of the complementary portions of the mold, which dowel pins are in position to register with complementary recesses 28 formed in the complementary mold portion.

When the complementary mold members 16 and 18 are fitted together, recesses 30 are formed near each end on each side, which recesess are in coordinated, spaced relation on each side of the mold with respect to the mold cavities 4. These recesses are so positioned as to complementarily receive upright support members 32 of the multi-cavity pouring ladle 2. It is preferable to have the lower end of these support members pointed to enable these members to quickly register with the respective recesses 30 in the mold body. A transverse bar 34 is positioned between the upper ends of support members 32, which transverse bar has a downwardly extending, apertured lug 36 mediate the ends thereof. A rod 38 extends through the aperture in the lug and through one of the upright support members 32, so as to form a shaft. A handle 40 is attached to and extends outward from rod 38 adjacent lug 36, which handle 40 is preferably heat insulated. A handle 42 is secured to transverse bar 34 immediately above handle 40, which handle 42 is also heat insulated. The handle 42, as will best be seen in FIGS. 1 and 2, is in position whereby the entire ladle assembly may be readily lifted from the pot of molten metal to the mold, for molding weights, sinkers or the like. The handle 40 is in such close proximity to handle 42 that handle 40 may be moved, by the use of one hand, from the position as shown in full outline in FIG. 2, to that shown in dashed outline.

The opposite end of the rod 38 has a lever 44 secured thereto for movement with the rod 38.

A pouring ladle 46, having a multiplicity of complementary cavities formed therein, is pivotally mounted on pivot pins 48, which pivot pins extend through apertures which are formed in upright standards 32. FIGS. 1, 3, and 5 show the general construction of the cavities designated at 50 and 50a. The portion of the pouring ladle designated at d shows larger cavities than the portion of the ladle designated at e, these portions, preferably being separate elements, these separate elements of the pouring ladle may be quickly detached, removed and another ladle portion substituted therefor, as will be more fully set out hereinafter. The multi-cavity ladle assembly 46 has an outstanding arm 52 thereon, which arm is apertured. A rod 54 extends between the outer end of lever 44, which is apertured, and the apertured arm 52, so upon movement of lever 44, the arm 52, which is attached to multi-cavity mold 46, will be moved about pivot pins 48, which will rock the ladle from an upright position, as shown in FIG. 3, to a position as shown in FIG. 5, so that the molten metal will be poured from the ladle cavities 50 or 50a into the complementary cavities of the mold. A spring 56 engages an aperture in support member 32 and the other end is attached to the outstanding arm 52 so as to normally retain the mold cavities 50 or 50a in upright position, as indicated in FIG. 3. A quick detachable "hair pin" cotter key 58 is provided to interengage an annular groove on outturned rod 54, which will enable the quick removal of the rod 54 from the ladle arm 52; then by springing the upright support members 32 outward, the ladle 46, such as ladle d, may be removed and a ladle member having cavities of a different size may be inserted in its stead, such as indicated at e. The ladle cavities are formed to measure, in precise amounts, that is, the cavities of a ladle member may be provided, for instance, with ten cavities, each of which will hold an equal, measured amount of metal, say one ounce. Another ladle member will have a like number of cavities, such as indicated at 50a, but to hold a different, measured amount of molten metal, for example, one-third of an ounce.

Since small weights, such as fishing sinkers, are tedious to mold, one at a time, therefore the present device, reduces the labor of production, and thereby the cost. The present multi-cavity mold member and complementary pouring ladle are designed to pour the maximum number of weights in a minimum amount of time, and with a minimum of investment in equipment. Since the freight on lead weights or fishing sinkers made of lead or other heavy metal, is very definitely an item of expense, it is expedient to procure metal near the sales source, and to distribute the weights or sinkers in the local territory, thereby obviating the expense of shipping, which might cost as much or more than to manufacture the weights.

It is preferable to have the mold cavities 4 in each side of the mold, as will best be seen in FIGS. 3, 4, and 5, which will greatly expedite the molding of the weights. It is preferable to have the core pins 8 threaded into the mold members 16 and 18, as will best be seen in FIGS. 4 and 5. In this manner these pins may be removed and replaced, should they become damaged or burned out.

The same mold may be used for molding sinkers of different weight, as indicated at a, b, and c, in FIG. 7, and at a and b in FIGS. 3 and 5.

Operation

When it is desired to mold a series of sinkers, as indicated at b, a multi-cavity pouring ladle, of proper size, is selected, so that when the ladle cavities 50 are filled with metal, by immersing the ladle in a pot of molten metal, each of the cavities will hold the same amount of metal and will be of a size to produce a particular size and weight sinker, whereupon the ladle is lifted from the pot of metal by means of handle 42, with the handle 40 being in the position as indicated in full outline in FIG. 2, the points on the lower end of upright standard are placed in recesses 30, which will cause ladle cavities 50 or 50a to be in complementary relation with the respective mold cavities 4, whereupon, the handle 42 is moved rearwardly, as the handle 40 is lifted, until the ladle is in the position as shown in FIGS. 1 and 5, to pour the metal from the cavities 50 of the ladle into the cavities 4 of the mold member. Upon release of handle 40, the ladle 46 will return to an upright position. The mold body may then be reversed, the cavities that were on the lower side during the first pouring process, are turned into position to receive molten metal poured from ladle 46, whereupon the mold is replaced in clips 20, and the ladle filled from the pot of molten metal and the cavities filled as hereinbefore set out.

The portions of the mold body may be separated to release the weights that have been formed therein, then the whole cycle repeated.

Upon completion of the pouring operation, the handles 24 of the mold 1 are gripped in a manner to remove the mold 1 from clips 20, whereupon, the mold members may be readily separated by the movement of the thumb and finger of each hand, then the sinkers or weights may be dumped from the mold, due to the angle of "draw" of the molds. The mold may then again be fitted together so that the dowel pins 26 will fit within holes 28, and the mold replaced in clips 20, which clips are preferably screwed to a plane surface by screws 22, in aligned relation. The mold is then ready for another molding of sinkers of the size desired.

The molding of different size sinkers, as indicated at a, entails the removal of the ladle member d and the replacement thereof by a ladle member, as indicated at e. In this instance the mold cavities 50a in ladle member e will fill cavities 4 for only a small portion of the conical length, however, the taper and the proportion of the sinker will be the same in a small weight or sinker, as it is for a weight that entirely fills the cavities 4, thereby obviating the necessity for a multiplicity of intricate mold members. Multi-cavity ladles, as shown in FIGS. 2, 3, and 5 do not involve, in the making thereof, intricate work in forming the recesses, so a number of multi-cavity ladle members of different capacities may be provided with comparatively little expense, so sinkers of different size may be formed in the same mold cavity. The multi-cavity molds are precision made and require intricate and expensive work in the preparation thereof, however, by using ladle members of different capacity, any size weight may be molded in the same mold. The mold cavities 4 open to opposite sides of the mold, therefore they may be brought readily into register with the cavities of the pouring ladle, and it will readily be seen that mass production may be had, with a minimum amount of equipment, and whereby it is possible to pour a wide range of sizes of weights or sinkers with this equipment.

While the invention has been illustrated and described in some detail in one embodiment thereof, it is to be understood that changes may be made in the minor de- Having thus clearly shown and described the invention, what is claimed as new and desired to secure by Letters Patent is:

1. A ladle for pouring a plurality of parcels of liquid material, comprising a pair of upright supports, an elongated unitary ladle member pivotally mounted about a longitudinal axis intermediate said upright supports, said ladle member having a plurality of longitudinally aligned recesses formed therein in side by side relation, a transverse bar abridging said upright supports, handle means on said transverse bar for lifting said ladle, resilient means connected to said ladle for normally retaining said ladle in upright position, said ladle supports extending below said ladle a sufficient distance to permit free pivotal action of said ladle on said pivots, and lever and linkage means connected to said ladle for moving said ladle from upright position to pouring position.

2. The device as defined in claim 1, wherein the lower ends of said support members are pointed.

3. In an apparatus for casting plural metallic articles including an elongated mold body having a plurality of mold cavities spaced longitudinally in a row therein and a plurality of pivotally mounted ladles adapted to pour molten metal simultaneously into a corresponding plurality of said cavities, the improvement comprising an elongated mold body having a plurality of said cavities spaced longitudinally along opposite sides thereof, said mold body being divided longitudinally including the cavities in opposite sides thereof to form a pair of cooperating similar half mold sections, means for securing said half mold sections together in cooperating mating relation during casting of metallic articles in the cavities therein, means for rotatably supporting opposite ends of said mold body so that the entire mold body may be inverted to permit casting of articles alternately in the cavities on opposite sides thereof, a ladle support including a plurality of upright members for pivotally mounting the ladles thereon, and registration means mounted on the mold body for engaging said upright members to position the ladles in proper pouring relation with the mold cavities in the mold body.

4. The apparatus defined by claim 3 wherein said registration means is a plurality of recesses formed near each end and on opposite sides of the mold body, and said upright members are vertical bars having pointed lower ends adapted to fit removably into said recesses to position the ladles in proper pouring relation with the mold cavities in the mold body.

5. A reversible mold for casting plural metallic articles, comprising an elongated mold body having a plurality of mold cavities spaced longitudinally in a row along one side of said body and having a second row of mold cavities spaced longitudinally along the opposite side of said body, said mold body being divided longitudinally including the cavities on opposite sides thereof to form a pair of cooperating similar mold half sections, and means for securing said mold half sections together in cooperating mating relation during casting of metallic articles in the cavities therein, whereby the mold may be inverted to cast articles alternately in the cavities on opposite sides thereof, each of the mold cavities being generally conical in configuration and tapering outwardly from an apex portion located in the interior of the mold body to a base portion forming an open mold cavity entrance on the outer face of the mold body, and said conical cavities being located in symmetrical alternate opposed relationship longitudinally along the mold body with the row of cavities on one side thereof being interposed between adjacent cavities on the opposite side thereof within the interior of the mold body.

References Cited in the file of this patent

UNITED STATES PATENTS

| 870,869 | Custer | Nov. 12, 1907 |
| 910,476 | Seidel | Jan. 19, 1909 |
| 1,722,777 | Wellman | July 30, 1929 |
| 1,869,305 | Dockman | July 26, 1932 |
| 2,380,751 | Gowland | July 31, 1945 |

FOREIGN PATENTS

| 482,041 | Germany | Sept. 5, 1929 |